United States Patent
Chen et al.

(10) Patent No.: US 6,876,911 B2
(45) Date of Patent: Apr. 5, 2005

(54) CONTROLLER FOR MOTOR POWER STEERING SYSTEM

(75) Inventors: Hui Chen, Gunma (JP); Shuji Endo, Gunma (JP)

(73) Assignee: NSK Ltd., Tokyo (JP)

( * ) Notice: Subject to any disclaimer, the term of this patent is extended or adjusted under 35 U.S.C. 154(b) by 185 days.

(21) Appl. No.: 10/009,780

(22) PCT Filed: May 14, 2001

(86) PCT No.: PCT/JP01/03981

§ 371 (c)(1),
(2), (4) Date: Dec. 17, 2001

(87) PCT Pub. No.: WO01/89910

PCT Pub. Date: Nov. 29, 2001

(65) Prior Publication Data

US 2002/0116105 A1 Aug. 22, 2002

(30) Foreign Application Priority Data

May 24, 2000 (JP) ........................................ 2000-152517

(51) Int. Cl.$^7$ .............................. B62D 4/04; B62D 1/00
(52) U.S. Cl. ............................ 701/41; 701/42; 180/400
(58) Field of Search ............................... 701/41, 42, 43, 701/36; 180/400, 404, 413, 416, 443, 446, 204, 6.2

(56) References Cited

U.S. PATENT DOCUMENTS

| 4,637,483 | A | * | 1/1987 | Eto et al. .................... 180/142 |
| 4,753,309 | A | * | 6/1988 | Marumoto et al. ......... 180/79.1 |
| 5,469,357 | A | * | 11/1995 | Nishimoto ............. 364/424.05 |
| 5,894,205 | A | * | 4/1999 | Shimizu et al. ............. 318/432 |
| 5,928,298 | A | * | 7/1999 | Matsuoka et al. ............ 701/41 |
| 5,992,557 | A | * | 11/1999 | Nakamura et al. .......... 180/446 |
| 6,240,350 | B1 | * | 5/2001 | Endo ........................... 701/41 |
| 6,272,410 | B2 | * | 8/2001 | Okanoue et al. ............. 701/42 |

* cited by examiner

*Primary Examiner*—Tan Q. Nguyen
*Assistant Examiner*—Dalena Tran
(74) *Attorney, Agent, or Firm*—Sughrue Mion, PLLC

(57) ABSTRACT

A control unit for an electric power steering apparatus can obtain continuous, stable and comfortable feeling of steering, for improved steering, based on a provision of a continuous hysteresis characteristic using a low-cost structure on software. For this purpose, the control unit for an electric power steering apparatus controls a motor for giving steering assist force to a steering mechanism based on a current control value calculated from a steering assist command value calculated based on the steering torque generated in the steering shaft, and a current value of the motor. The control unit includes an assist calculating unit that differentiates a signal of the steering torque, adds the differentiated value to the steering assist command value, and continuously changes the differential gain according to the steering torque and the size of the vehicle speed.

2 Claims, 12 Drawing Sheets

CONTROLLER FOR MOTOR POWER STEERING SYSTEM

TECHNICAL FIELD

The present invention relates to a control unit for an electric power steering apparatus that provides steering assist force by a motor to the steering system of an automobile or a vehicle. The present invention particularly relates to a control unit for an electric power steering apparatus that gives safe and comfortable steering performance through the provision of continuous steering feeling in a low-cost structure.

BACKGROUND ART

An electric power steering apparatus that applies assist load to the steering apparatus of an automobile or a vehicle with turning effort of a motor applies the driving force of the motor to a steering shaft or a rack axis based on a transmission mechanism like gears or belts via a reduction gear. Such a conventional electric power steering apparatus carries out a feedback control of a motor current for accurately generating an assist torque (a steering auxiliary torque). The feedback control is for adjusting a motor application voltage so as to minimize a difference between a current control value and a motor current detection value. The motor application voltage is generally adjusted based on a duty ratio of a PWM (Pulse Width Modulation) control.

A general structure of an electric power steering apparatus will be explained with reference to FIG. 9. A shaft 2 of a steering wheel 1 is connected to a tie rod 6 of running wheels through a reduction gear 3, universal joints 4a and 4b, and a pinion rack mechanism 5. The shaft 2 is provided with a torque sensor 10 for detecting a steering torque of the steering wheel 1. A motor 20 for assisting the steering force of the steering wheel 1 is connected to the shaft 2 through a clutch 21 and the reduction gear 3. A control unit 30 for controlling the power steering apparatus is supplied with power from a battery 14 through an ignition key 11. The control unit 30 calculates a steering assist command value I of an assist command based on a steering torque T detected by the torque sensor 10 and a vehicle speed V detected by a vehicle speed sensor 12. The control unit 30 then controls a current to be supplied to the motor 20 based on the calculated steering assist command value I. The clutch 21 is ON/OFF-controlled by the control unit 30, and is kept ON (connected) in an ordinary operation status. When the control unit 30 has decided that the power steering apparatus is in failure, and also when the power source (voltage Vb) of the battery 14 has been turned OFF with the ignition key 11, the clutch 21 is turned OFF (disconnected).

The control unit 30 is mainly composed of a CPU. FIG. 10 shows general functions to be executed based on a program inside the CPU. For example, a phase compensator 31 does not show a phase compensator as independent hardware, but shows a phase compensation function to be executed by the CPU.

Functions and operation of the control unit 30 will be explained below. A steering torque T detected by the torque sensor 10 and then input is phase-compensated by the phase compensator 31 for increasing the stability of the steering system. The phase-compensated steering torque TA is inputted to a steering assist command value calculator 32. A vehicle speed V detected by the vehicle speed sensor 12 is also inputted to the steering assist command value calculator 32. The steering assist command value calculator 32 calculates a steering assist command value I as a control target value of a current to be supplied to the motor 20, based on the input steering torque TA and the input vehicle speed V. The steering assist command value I is inputted to a subtractor 30A, and is also inputted to a differential compensator 34 of a feedforward system for increasing a response speed. A difference (I−i) calculated by the subtractor 30A is inputted to a proportional calculator 35, and is also inputted to an integration calculator 36 for improving the characteristic of a feedback system. Outputs from the differential compensator 34 and the integration compensator 36 are inputted to and added together by an adder 30B. A result of the addition by the adder 30B is obtained as a current control value E, and this is inputted to a motor driving circuit 37 as a motor driving signal. A motor current value i of the motor 20 is detected by a motor current detecting circuit 38, and this motor current value i is inputted to the subtractor 30A and is fed back.

An example of a structure of the motor driving circuit 37 will be explained with reference to FIG. 11. The motor driving circuit 37 comprises an FET gate driving circuit 371 for driving each gate of field-effect transistors (FETs) FET1 to FET4 based on the current control value E from the adder 30B, an H-bridge circuit composed of the FET1 to the FET4, and a step-up power source 372 for driving a high side of the FET1 and the FET2, respectively. The FET1 and the FET2 are ON/OFF-controlled by a PWM (Pulse Width Modulation) signal of a duty ratio D1 determined based on the current control value E, and the size of a current Ir that actually flows to the motor 20 is controlled. The FET3 and the FET4 are driven by a PWM signal of a duty ratio D2 defined by a predetermined linear functional expression (D2=a·D1+b, where a and b are constants) in an area where the duty ratio D1 is small. When and after the duty ratio D2 has also reached 100%, the FET3 and the FET4 are ON/OFF-controlled according to a rotation direction of the motor 20 determined by a sign of the PWM signal.

According to a widely-distributed hydraulic power steering apparatus, the apparatus has a characteristic that the friction of a cylinder section increases in proportion to a cylinder pressure P (a horizontal axis T represents a steering torque), as shown in FIG. 12. The apparatus has hysteresis because of the frictional characteristic. When a vehicle is cornering, for example, the hysteresis prevents the steering wheel from being suddenly returned by a self-aligning torque. This improves the steering of the driver. FIG. 13 shows this status. When the steering torque T has suddenly changed by A T, the cylinder pressure changes by P1 in the absence of hysteresis. However, in the presence of hysteresis, the cylinder pressure changes by P2(<P1). Therefore, in the presence of the hysteresis, it is possible to make smooth the change in the cylinder pressure P in relation to a change in the steering torque T. It has been known that the hysteresis width changes according to a size of friction. In the case of a rubber packing of a hydraulic cylinder, the rubber is compressed along an increase in the cylinder pressure. The hysteresis width increases based on an increase in Coulomb friction. It is important for the steering that the driver feels strong self-aligning torque at a neutral point, and does not feel so strong self-aligning torque when the vehicle is cornering. In this sense, it is ideal that, like in the hydraulic power steering apparatus, the friction (hysteresis) becomes small in an area of a small steering angle θ, and the friction (hysteresis) becomes large in an area of a large steering angle θ.

On the other hand, according to an electric power steering apparatus, the apparatus has constant friction independent of the assist torque T, as shown in FIG. 14. The electric power steering apparatus has a feature that it has a constant friction characteristic independent of steering force, as the Coulomb friction of the motor mainly rules out. Thus, the hysteresis has a characteristic that it has a constant width as shown in FIG. 13. However, the hysteresis width is narrower than the hysteresis width of the hydraulic power steering apparatus during its high-torque time. Therefore, in the electric power steering apparatus, the friction is compensated for in the area of a small steering torque T by attaching importance to the friction characteristic in this area. According to this compensation, however, the friction becomes smaller in an area where the steering torque T is large, as shown in FIG. 15. As a result, the stable feeling of steering is lost when the steering torque T is large when the vehicle is cornering.

As a control unit that solves the above problems, there is one example disclosed in Japanese Patent Application Laid-open No. 9-156526 A. According to this, a vehicle steering control unit has a steering torque detector for detecting a steering torque, and this control unit controls the assist volume of an electric power assisting unit, based on a detection signal outputted from this steering torque detector. In this vehicle steering control unit, there is provided an adjuster for giving the hysteresis to the detection signal of the steering torque detector.

With the provision of the adjuster, it is possible to give the hysteresis to the detection signal of the steering torque detector. Therefore, it is possible to change the hysteresis characteristic of the operating power assisting unit according to the steering status, based on the detection signal of the steering torque. As a result, it is possible to optimize the torque assist volume. However, according to this conventional unit, there remains a feeling of intermittence in the steering operation, and the torque control system is unstable. Thus, there has been a problem in that the conventional unit leads to a cost increase because of the need for a provision of new hardware structure.

Further, the present applicant has disclosed a device in Japanese Patent Application Laid-open No. 2000-95131 A. According to this device, a negative differential gain is applied when the steering wheel returns, thereby to prevent a sudden reduction in the assist volume. A positive differential gain is applied when the steering wheel is turned. As a result, a large hysteresis characteristic is given in a high-torque area, and a small hysteresis characteristic is given in a low-torque area near the neutral point. However, according to this device, there is a risk of the occurrence of an unnatural feeling of steering, when the negative and positive differential gains are too different in the changeover between the negative and positive differential gains based on a steering pattern of the returning and turning of the steering wheel.

Further, Japanese Patent Application Laid-open No. 10-291481 A discloses a device capable of obtaining a comfortable steeling feeling regardless of a running speed and a steering angle of the steering wheel. However, the importance is placed on only the stability of the control system, and therefore, this device has a problem in the responsiveness of the assist torque.

The present invention has been made in the light of the above situations. It is an object of the present invention to provide a control unit for an electric power steering apparatus capable of obtaining continuous, stable and comfortable feeling of steering, for improved steering performance of the steering wheel, based on a provision of a continuous hysteresis characteristic in an adjustable width to the electric power steering apparatus using a low-cost structure on software.

DISCLOSURE OF THE INVENTION

The present invention provides a control unit for an electric power steering apparatus that controls a motor for giving steering assist force to a steering mechanism based on a current control value calculated from a steering assist command value calculated based on the steering torque generated in the steering shaft, and a current value of the motor. The object of the present invention can be achieved based on the provision of an assist calculating unit that differentiates a signal of the steering torque, adds the differentiated value to the steering assist command value, and continuously changes the differential gain according to the steering torque and the size of the vehicle speed.

Further, the object of the present invention can be achieved more effectively by the following arrangement. The assist calculating unit is connected in parallel with the calculating unit, and is structured by an approximate differentiator, a gain adjuster and an adder. Alternatively, the gain of the gain adjuster is set larger as the steering torque becomes smaller, and is set smaller as the steering torque becomes larger. Alternatively, the gain of the gain adjuster is set smaller as the vehicle speed becomes larger, in a predetermined area of the steering torque.

BEST MODE FOR CARRYING OUT THE INVENTION

According to the present invention, with an object of improving the responsiveness of assist torque and improving the stability of a torque control system, a value proportional to a differential of a steering torque signal is added to an assist volume (a steering assist command value), by changing a differential gain according to the steering torque and the size of a vehicle speed, in order to increase the responsiveness of the control system. Based on the continuous changing of the differential gain, there occurs no large variation in the differential gain when the steering torque, the vehicle speed and the steering pattern are changed. Therefore, it is possible to prevent an unnatural feeling of steering and to obtain comfortable steering performance. Further, based on the increasing of a differential gain in an area of a small steering torque, it is possible to obtain a characteristic of small hysteresis by increasing the responsiveness in an area near the neutral point. As a result, it is possible to obtain the comfortable steering performance, and to maintain responsiveness and stability in an area of a large steering torque.

Further, in an area of a predetermined steering torque, a differential gain is set smaller as the vehicle speed increases, and a negative differential gain is included. With this arrangement, it is possible to prevent a sudden reduction in the assist volume when the steering wheel returns. As a result, it is possible to obtain an equivalent large hysteresis characteristic, thereby achieving the stability in the steering when the vehicle is cornering.

Embodiments of the present invention will be explained below with reference to the drawings.

Figure 1:
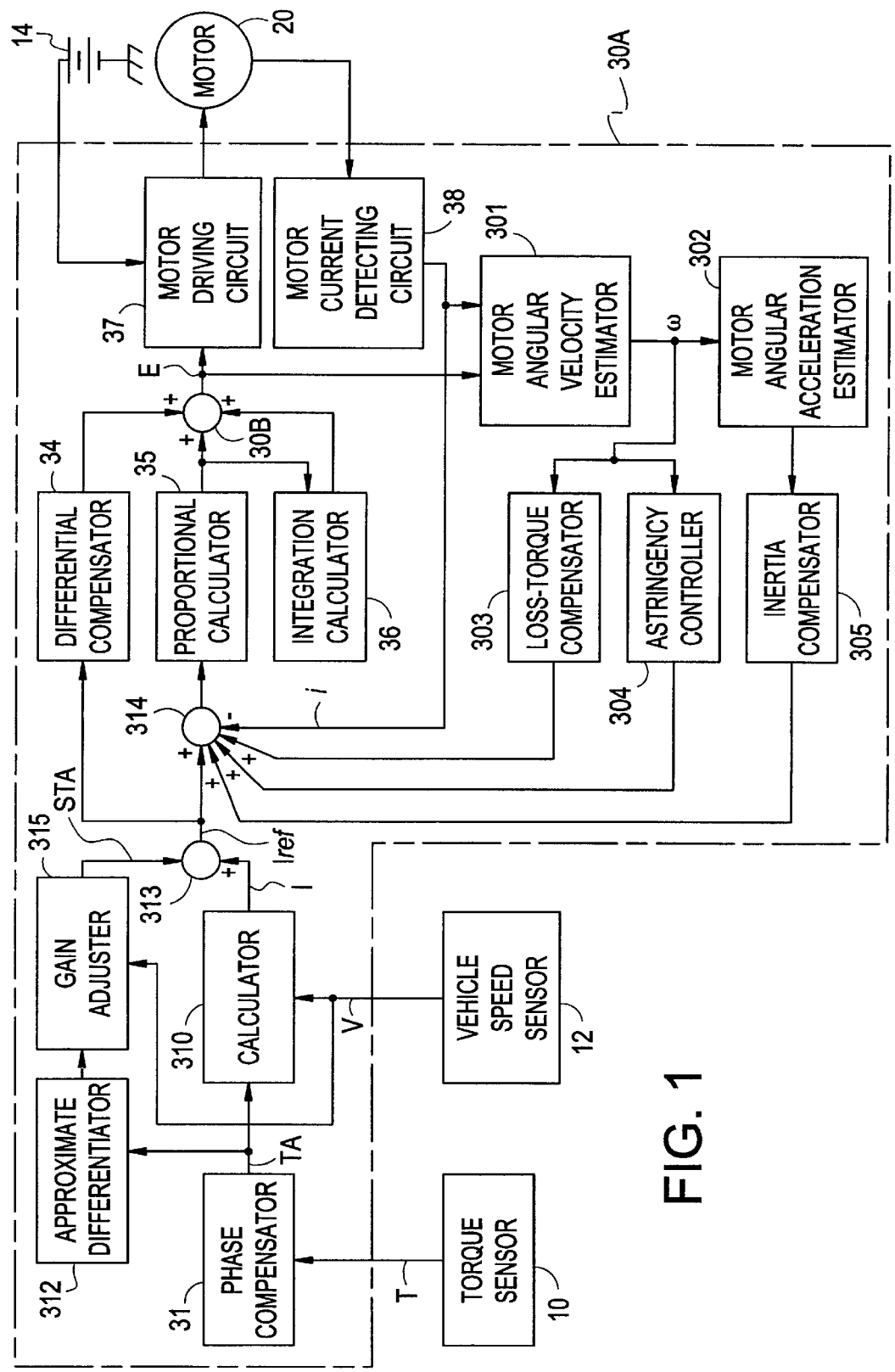
FIG. 1 is a block diagram showing an example of a configuration of the present invention.
Figure 9:
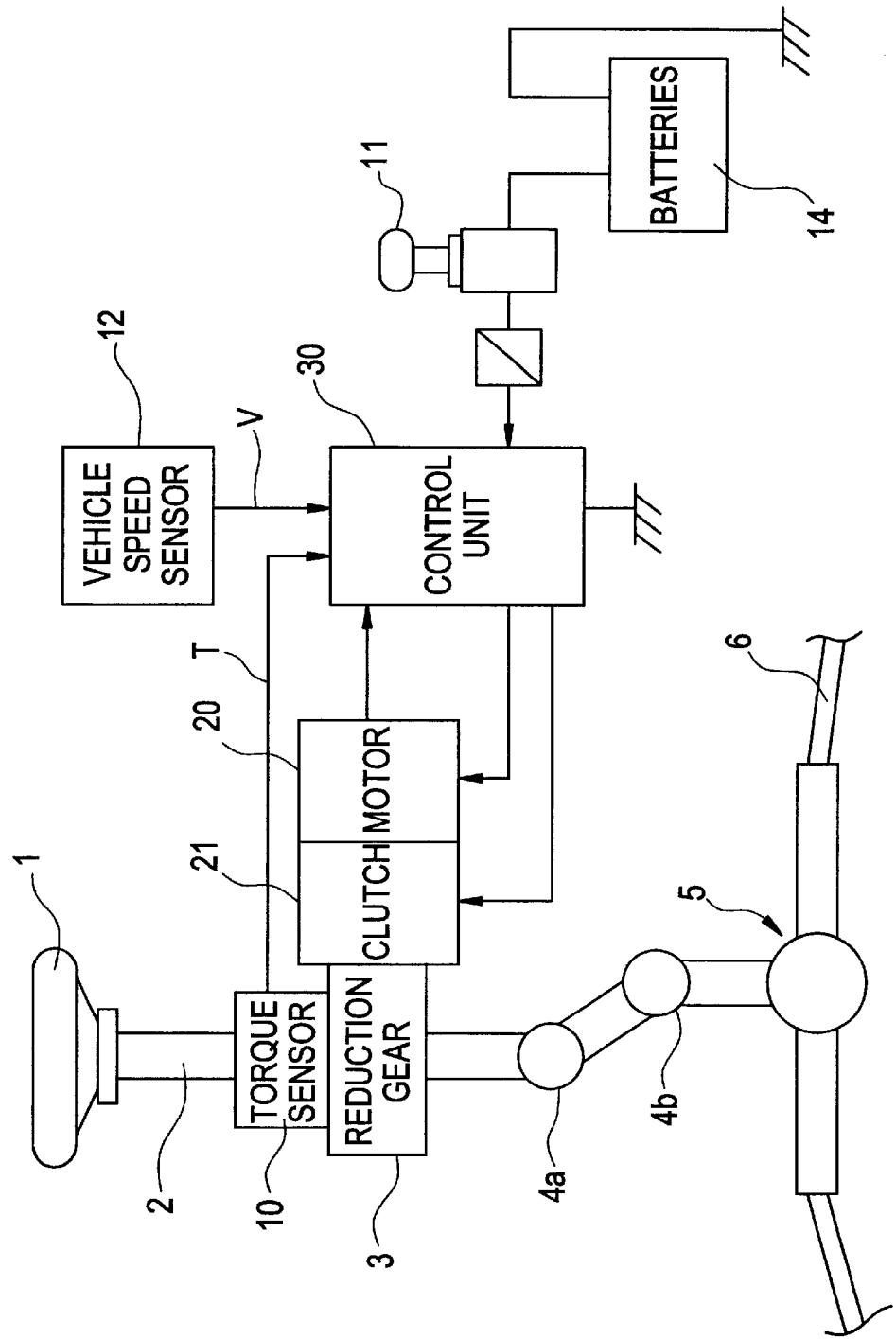
FIG. 9 is a block structure diagram showing one example of an electric power steering apparatus.
Figure 10:
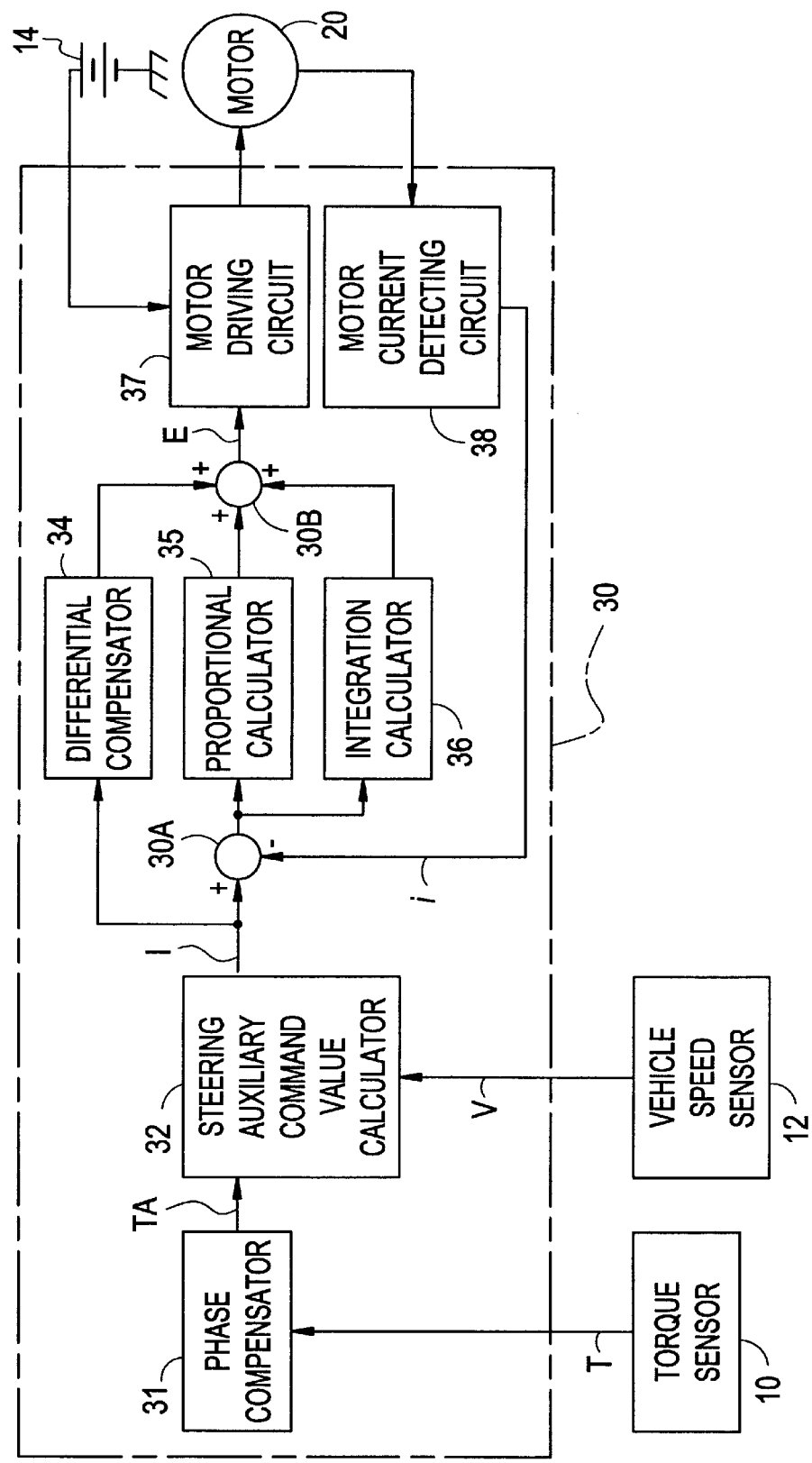
FIG. 10 is a block diagram showing a general internal structure of a control unit.
Figure 11:
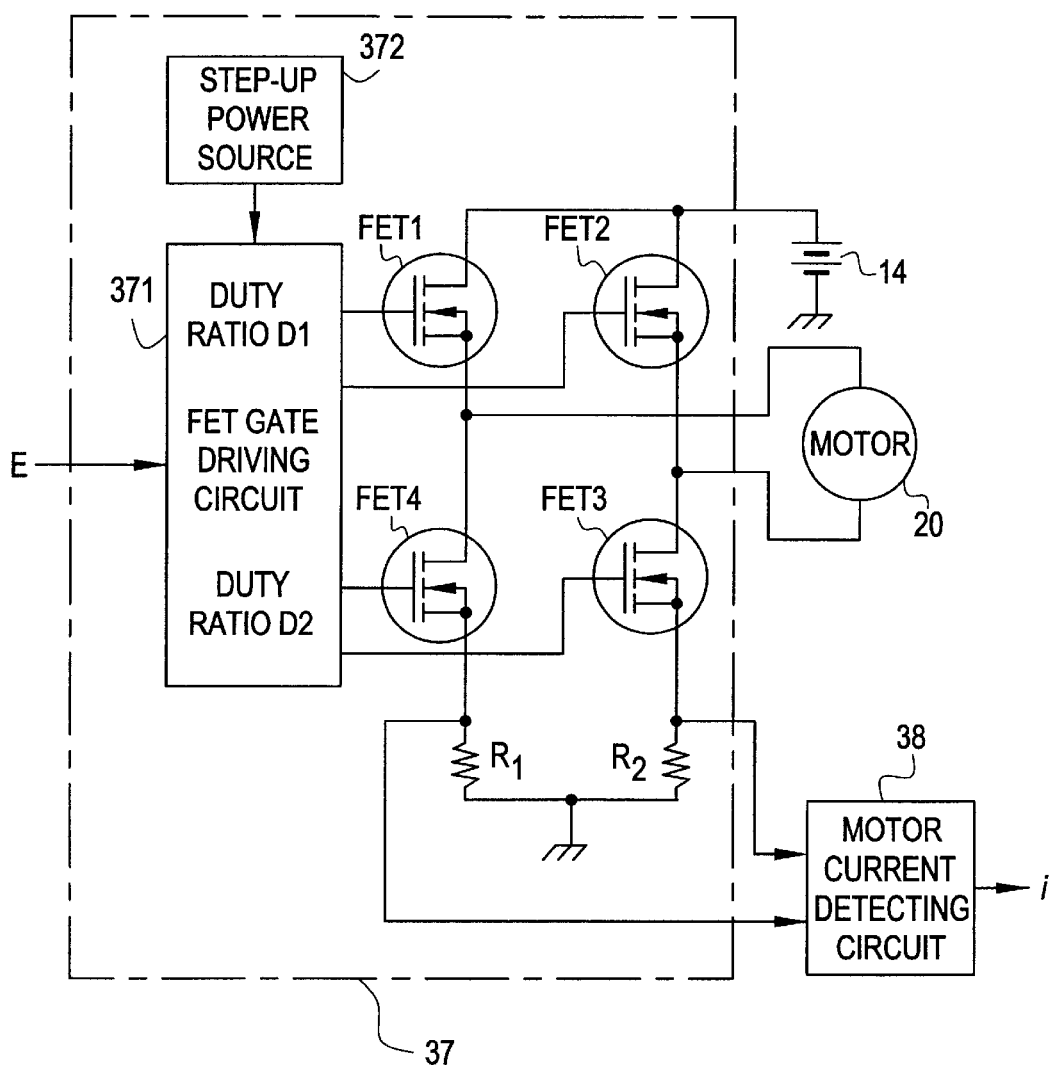
FIG. 11 is a line connection diagram showing one example of a motor driving circuit.
Figure 12:
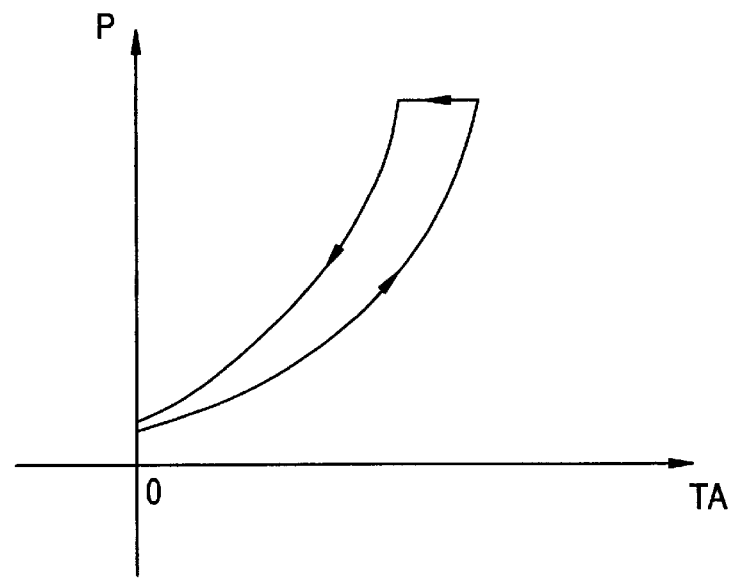
FIG. 12 is a diagram showing an example of the operation of a hydraulic power steering apparatus.
Figure 13:
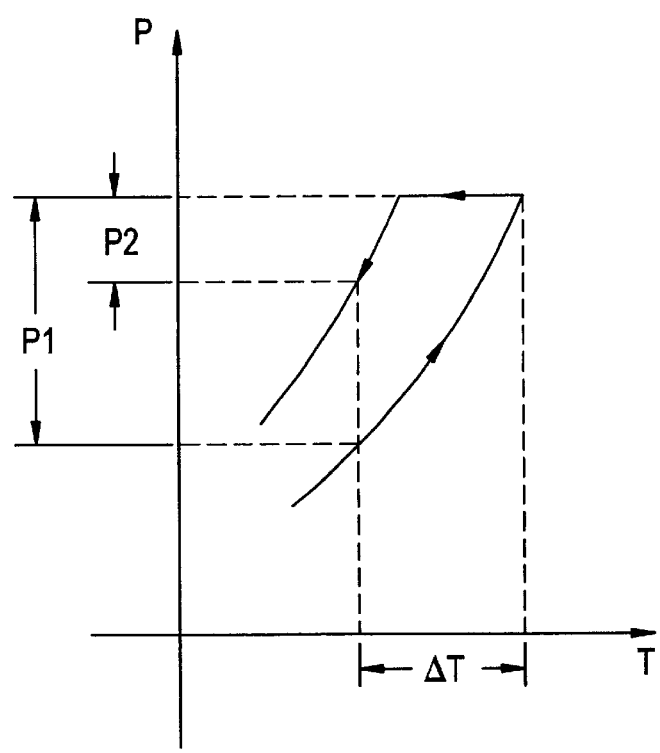
FIG. 13 is a diagram for explaining effects of hysteresis characteristics.
Figure 14:
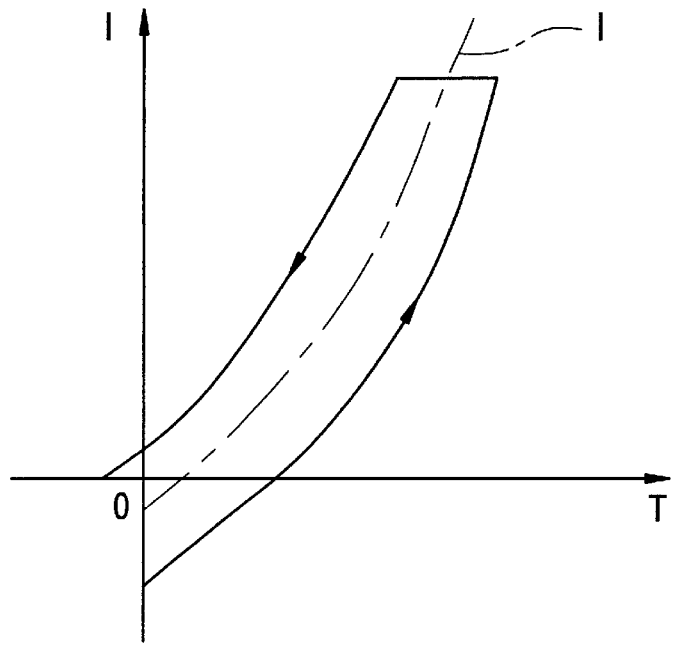
FIG. 14 is a diagram showing an example of the operation of an electric power steering apparatus.
Figure 15:
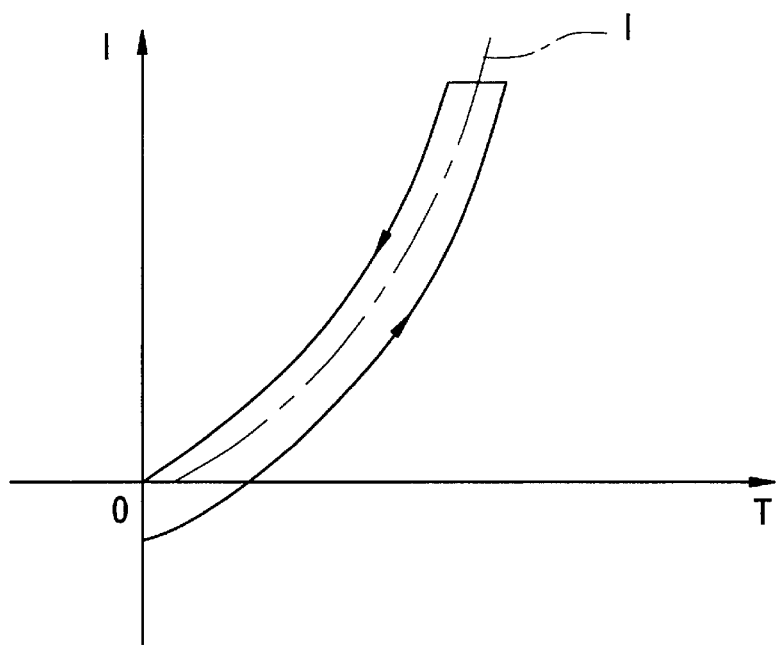
FIG. 15 is a characteristic diagram showing an example of the operation of an electric power steering apparatus.

FIG. 1 shows a structure of a control unit 30A according to the present invention in relation to FIG. 9. According to the present invention, a steering torque TA from a phase compensator 31 is inputted to a calculator 310 for calculating a steering assist command value I. The calculator 310 calculates the steering assist command value I using a vehicle speed V as a parameter. The steering assist command value I outputted from the calculator 310 is inputted to an adder 313. The steering torque TA is differentiated by an approximate differentiator 312. The differentiated output signal is inputted to a gain adjuster 315 that uses the vehicle speed V as a parameter. A gain-adjusted differential torque STA is inputted to the adder 313. A current command value Iref obtained by addition in the adder 313 is inputted to an adder/subtractor 314. The vehicle speed V has been inputted to the gain adjuster 315 as a parameter. The approximate differentiator 312, the gain adjuster 315, and the adder 313 constitute an assist calculating unit.

A motor angular velocity estimator 301 within the control unit 30A estimates a motor angular velocity ω based on a current control value E (corresponding to a voltage between the motor and the terminal) and a motor current value i. Then, the motor angular velocity estimator 301 inputs the estimated motor angular velocity ω to a loss-torque compensator 303 and an astringency controller 304. Outputs of the loss-torque compensator 303 and the astringency controller 304 are inputted to the adder/subtractor 314, respectively. The loss-torque compensator 303 assists the torque corresponding to a loss torque of the motor 20 to a direction in which the loss torque is generated. In other words, the loss-torque compensator 303 assists the torque to a rotation direction of the motor 20. The astringency controller 304 applies braking to the oscillation of the steering wheel for improving the astringency of the yaw of the vehicle. The motor angular velocity ω is inputted to a motor angular acceleration estimator (differentiator) 302, so that the motor angular acceleration estimator (differentiator) 302 estimates a motor angular velocity. The motor angular velocity is inputted to an inertia compensator 305. A compensation signal generated is inputted to the adder/subtractor 314. The inertia compensator 305 is for assisting the force corresponding to the force generated by the inertia of the motor 20. This prevents the degrading of inertia feeling or control responsiveness.

Figure 2:
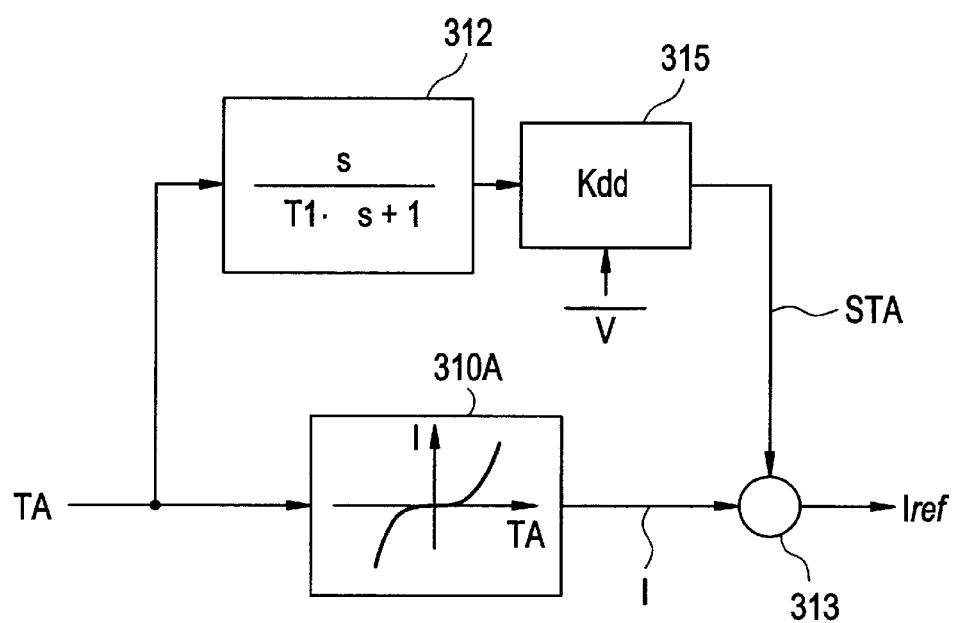
FIG. 2 is a transmission function block diagram showing key portions of the present invention.

The calculator 310 calculates the steering assist command value I and outputs this in a functional characteristic as shown in a block 310A in FIG. 2. For the sake of simplicity, a relationship of K ∝ TA is assumed, based on ΔI/ΔTA=K. The transmission function of the approximate differentiator 312 is as shown in a block 312 in FIG. 2, by assuming that the gain is "1". Gain Kdd of the gain adjuster 315 connected to the latter stage of the approximate differentiator 312 changes according to the vehicle speed V and the steering torque T. T1 represents an integration time constant, and s represents a Laplace variable. The following expression 1 is established for the current command value Iref from the block diagram shown in FIG. 2.

$$Iref = K + Kdd \cdot s/(T1^* s+1)$$

$$= (K \cdot T1 \cdot s + K + Kdd \cdot s)/(T1 \cdot s+1)$$

$$= \{(K \cdot T1 + Kdd)s + K\}/(T1 \cdot s+1)$$

$$= \{K/(T1 \cdot s+1)\}\{K \cdot T1 + Kdd)s/K+1\} \qquad \text{[Expression 1]}$$

Then, the following expression 2 is established.

$$(K \cdot T1 + Kdd)/K > T1 \qquad \text{[Expression 2]}$$

Figure 3:
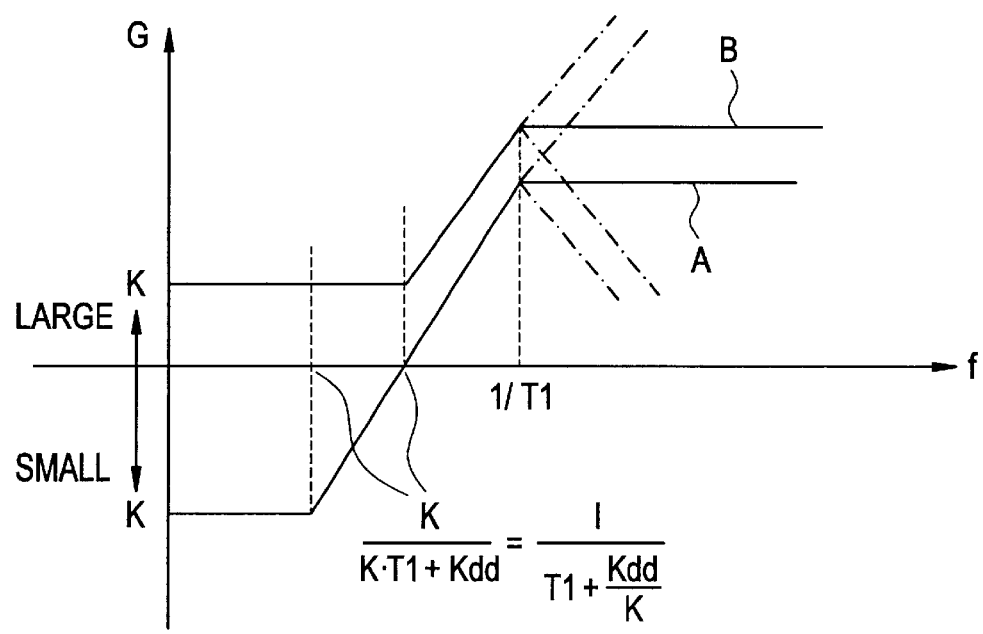
FIG. 3 is a diagram for explaining the operation of the present invention.

Therefore, the frequency characteristic of the expression 1 becomes as shown in FIG. 3.

Figure 4:
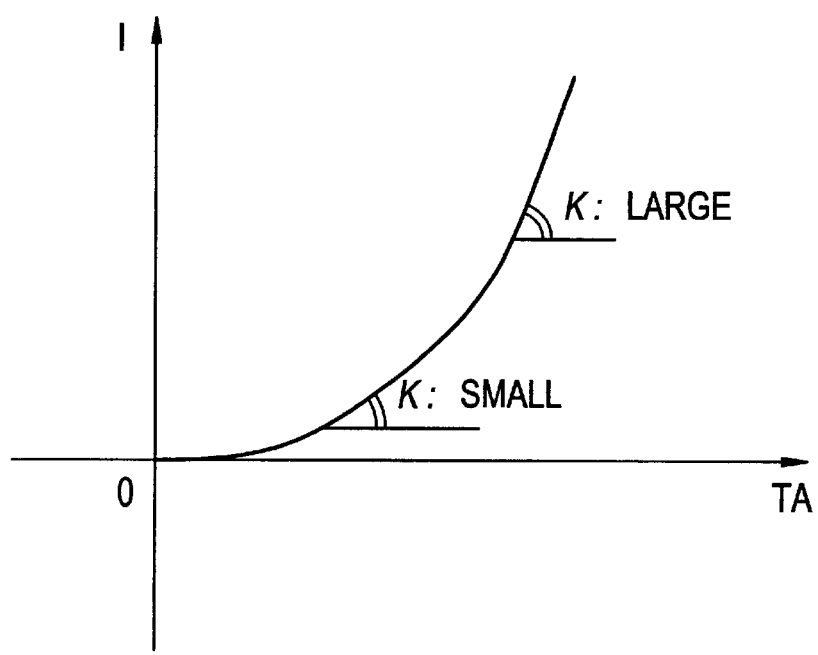
FIG. 4 is a diagram showing an example of a characteristic of a calculator.

In comparing the case when an assist characteristic gain K is small with the case when an assist characteristic gain K is large, a difference between gains G is small in an area of a frequency a or above when the assist characteristic gain K is large, regardless of the sizes of the assist characteristic gains K, as shown in FIG. 3. In other words, in an area of the frequency "a" or above, it is possible to obtain substantially constant responsiveness independent of the sizes of the assist characteristic gains K. The steering assist command value I as the output of the calculator 310 has such a characteristic that the assist characteristic gain K is small when the steering torque TA is small, and the assist characteristic gain K is large when the steering torque TA is large, as shown in FIG. 4. As a result, when the steering torque TA is small, the responsiveness is lowered than when the steering torque TA is large. Therefore, with the provision of the characteristics as shown in FIG. 3, it is possible to maintain the responsiveness in the high-frequency area, and to compensate for the influence of the friction and inertia of the motor.

Figure 5:
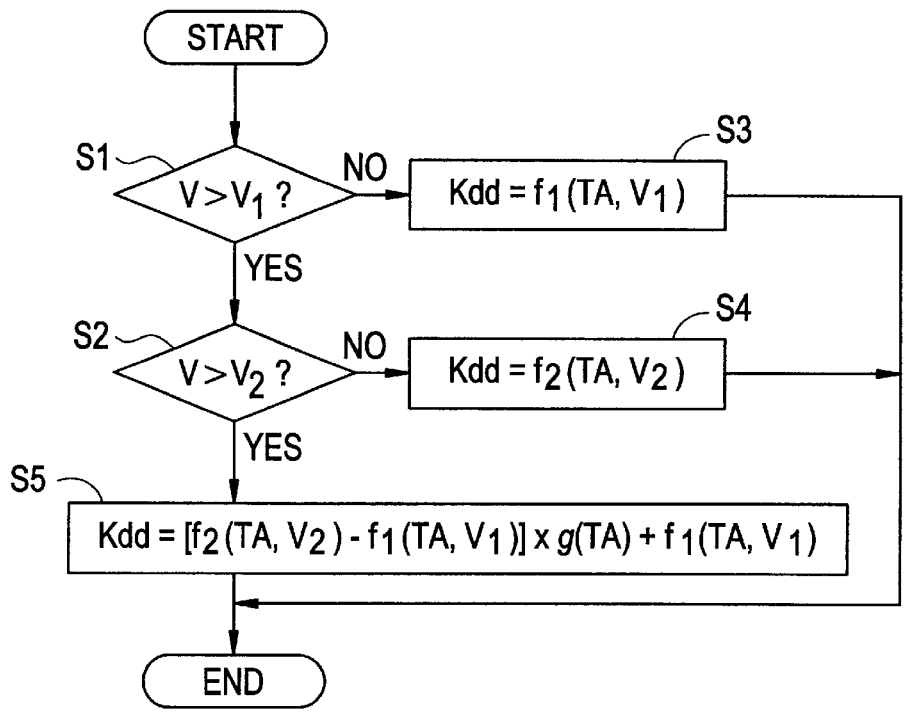
FIG. 5 is a flowchart showing an example of the operation of the present invention.

FIG. 5 is a flowchart showing an example of the operation according to the present invention. Assume that the vehicle speed V has a relationship of $V_2 > V_1 \geq 0$. First, it is decided whether the vehicle speed V is larger than $V_1$ or not (Step S1). When the vehicle speed V is equal to or smaller than $V_1$, the differential gain Kdd is set to $f_1$ (TA, $V_1$)(Step S3). When the vehicle speed V is larger than $V_1$, it is further decided whether the vehicle speed V is larger than $V_2$ or not (Step S2). When the vehicle speed V is equal to or smaller than $V_2$, the differential gain Kdd is set to $f_2$ (TA, $V_2$) (Step S4). When the vehicle speed V is larger than $V_2$, the differential gain Kdd is set as shown in the following expression 3 (Step S5).

$$Kdd = [f_2(TA, V_2) - f_1(TA, V_1)] \times g(TA) + f_1(TA, V_1) \qquad \text{[Expression 3]}$$

Figure 6:
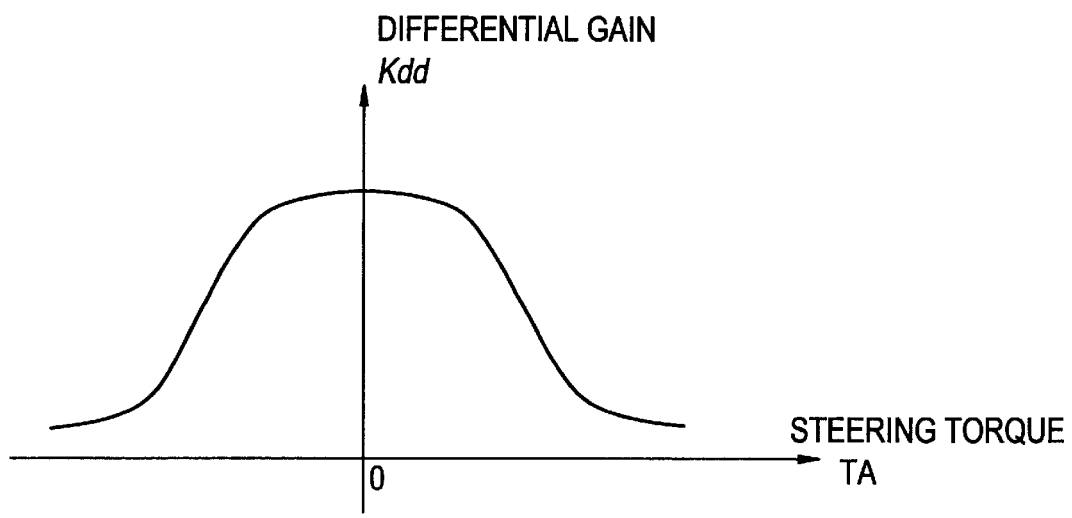
FIG. 6 is a diagram used in the present invention that shows an example of a characteristic of a relationship between a differential gain and a steering torque when a vehicle speed is zero.
Figure 7:
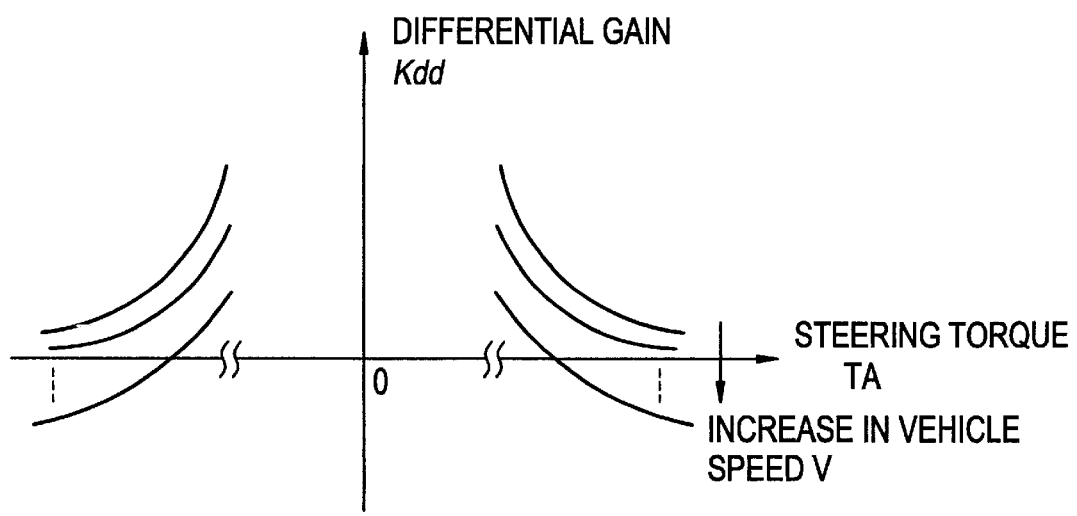
FIG. 7 is a diagram used in the present invention that shows an example of a characteristic of a relationship between a differential gain and a steering torque when a vehicle speed is increasing.

According to the present invention, the differential gain Kdd is changed using the vehicle speed V as a parameter, and at the same time, the differential gain Kdd is changed relative to the steering torque TA as shown in FIG. 6. In other words, FIG. 6 shows a relationship between the steering torque A when the vehicle speed V is 0 and the differential gain Kdd. The differential gain Kdd is set larger in an area where the steering torque TA is small, and the differential gain Kdd is set gradually smaller when the steering torque TA increases. Then, as shown in FIG. 7, the differential gain Kdd is set gradually smaller as the vehicle speed V increases, in a predetermined area of the steering torque TA.

Figure 8:
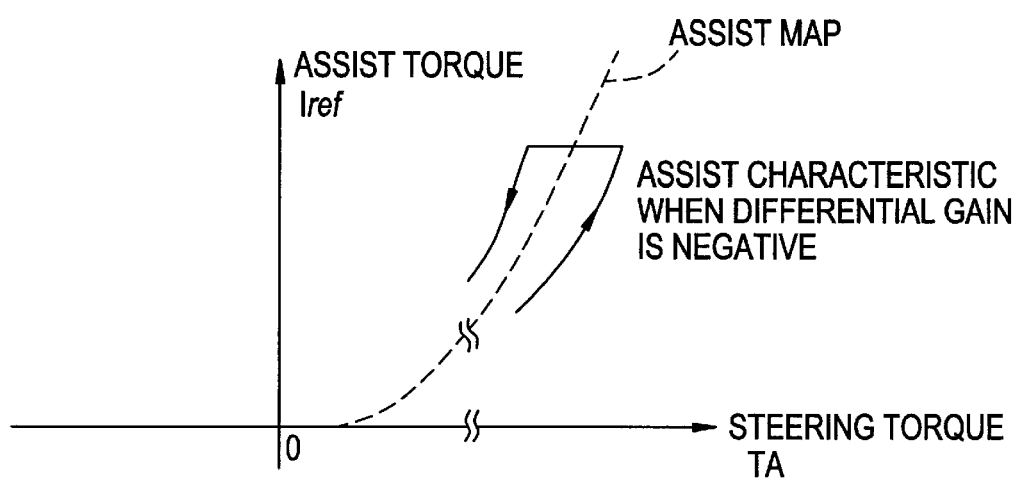
FIG. 8 is a diagram showing an assist characteristic having hysteresis when a differential gain is negative.

As described above, it is possible to equivalently adjust the hysteresis of the assist characteristic, by setting the differential gain Kdd smaller as the vehicle speed V increases. When the differential gain Kdd has become 0, the hysteresis of the assist characteristic is determined based on the friction of the mechanical system. When the differential gain Kdd has become negative, the hysteresis of the assist characteristic becomes larger than the hysteresis based on the friction of the mechanical system, as shown in FIG. 8.

INDUSTRIAL APPLICABILITY

According to the present invention, with an object of improving the responsiveness of the assist torque and improving the stability of the torque control system, a value proportional to a differential of a steering torque is added to an assist volume (a steering assist command value), by changing a differential gain according to the steering torque and the size of a vehicle speed, in order to increase the response and stability of the control system. As explained above, as a signal using the vehicle speed as a parameter based on a differentiated value is added to the assist volume, it is possible to achieve both the stabilized response characteristic near the neutral point and the prevention of a sudden reduction in the assist volume at time of cornering. As a result, there is an effect that it is possible to prevent an unnatural feeling of steering and to obtain comfortable steering feeling.

What is claimed is:

1. A control unit for an electric power steering apparatus of a vehicle that controls a motor for giving steering assist force to a steering mechanism based on a current control value calculated form a steering assist command value calculated by a calculating unit based on a steering torque generated in a steering shaft, and a current value of a the motor, the control unit comprising an assist calculating unit that differentiates and gain adjusts a steering torque signal, and adds the gain-adjusted differentiated torque signal to the steering assist command value;

wherein the assist calculating unit continuously changes a differential gain according to the steering torque and a speed of the vehicle, and is connected in parallel with the calculating unit, and includes an approximate differentiator, a gain adjuster and an adder; and the gain of the gain adjuster is set larger as the steering torque becomes smaller, and is set smaller as the steering torque becomes larger.

2. A control unit for an electric power steering apparatus of a vehicle that controls a motor for giving steering assist force to a steering mechanism based on a current control value calculated from a steering assist command value calculated by a calculating unit based on a steering torque generated in a steering shaft, and a current value of the motor, the control unit comprising an assist calculating unit that differentiates and gain adjusts a steering torque signal, and adds the gain-adjusted differentiated torque signal to the steering assist command value;

wherein the assist calculating unit continuously changes a differential gain according to the steering torque and a speed of the vehicle, and is connected in parallel with the calculating unit, and includes an approximate differentiator, a gain adjuster and an adder; and the gain of the gain adjuster is set smaller as the vehicle speed becomes larger, in a predetermined area of the steering torque.

* * * * *